United States Patent [19]
Arnold et al.

[11] 4,108,835

[45] Aug. 22, 1978

[54] PHENYLATED AROMATIC HETEROCYCLIC POLYMERS

[75] Inventors: Fred E. Arnold, Centerville, Ohio; James F. Wolfe, Menlo Park, Calif.

[73] Assignee: The United States of America as represented by the Secretary of the Air Force, Washington, D.C.

[21] Appl. No.: 811,345

[22] Filed: Jun. 29, 1977

[51] Int. Cl.$^2$ .................. C08G 73/22; C08G 75/32
[52] U.S. Cl. .................... 528/183; 528/172; 528/191; 528/176; 260/250 Q; 260/295 R; 260/332.2 R; 260/547.4; 260/515 M; 260/516; 260/520 D; 260/520 E
[58] Field of Search ............ 260/47 CP, 679, 49, 260/78 TF, 78.41

[56] References Cited

U.S. PATENT DOCUMENTS

| | | | |
|---|---|---|---|
| 3,376,257 | 4/1968 | Nakanishi et al. | 260/47 |
| 3,563,950 | 2/1971 | Steinmann et al. | 260/47 |
| 3,852,239 | 12/1974 | Bellmann et al. | 260/46.5 R |

*Primary Examiner*—Lester L. Lee
*Attorney, Agent, or Firm*—Joseph E. Rusz; Cedric H. Kuhn

[57] ABSTRACT

Para-ordered aromatic heterocyclic polymers containing pendant phenyl groups along the polymer chain backbones. The polymers possess a high degree of thermal stability that renders them particularly useful in high temperature applications such as in the fabrication of plastics, composites and fibrous materials.

8 Claims, No Drawings

PHENYLATED AROMATIC HETEROCYCLIC POLYMERS

RIGHTS OF THE GOVERNMENT

The invention described herein may be manufactured and used by or for the Government of the United States for all governmental purposes without the payment of any royalty.

FIELD OF THE INVENTION

This invention relates to para-ordered aromatic heterocyclic polymers containing pendant phenyl groups. In one aspect it relates to a method for synthesizing the polymers.

BACKGROUND OF THE INVENTION

Advanced aircraft and aerospace systems demand lighter weight structures which depend upon the availability and effective utilization of superior structural materials. The material requirements are not only for superior mechanical properties; the materials must also possess a high degree of thermal oxidative stability.

In U.S. Pat. No. 3,671,542, there is disclosed a series of new organic fibers which exhibit exceptionally high strength and modulus. The modulus values of the fibers approach those of boron and graphite while their tenacity values surpass those of any known fibers. The unique fibers are derived from the wet spinning of optically anistropic liquid crystal aromatic polyamide dopes. The anistropic solutions are obtained from the group of polyamides whose chain-extending bonds from each aromatic nucleus are essentially coaxial or parallel and oppositely directed in liquid media. As disclosed in the aforementioned patent, strong acids are used as solvents, which is a disadvantage from a processing standpoint. And while the aromatic polyamides exhibit superior mechanical properties, they do not meet the thermal and hydrolytic stability requirements for all aircraft and aerospace systems.

It is a principal object of the present invention, therefore, to provide polymer systems which exhibit the desired superior physical properties as well as the required high degree of thermal oxidative and hydrolytic stability.

Another object of the invention is to provide rod-like, para-ordered aromatic heterocyclic polymers with improved thermal oxidative stability as well as improved solubility characteristics.

A further object of the invention is to provide a method for synthesizing the polymers.

Other objects and advantages of the invention will become apparent to those skilled in the art upon consideration of the accompanying disclosure.

SUMMARY OF THE INVENTION

The present invention resides in para-ordered aromatic heterocyclic polymers consisting essentially of repeating units having a structure as represented by one of the following formulas:

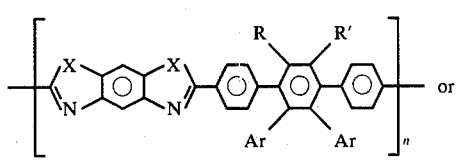

or

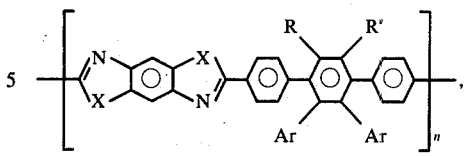

wherein each X is S or O, directed meta to each other as in Formula (I) or para to each other as in Formula II; Ar is a monovalent aromatic radical; R and R' are individually selected from the groups consisting of hydrogen, a monovalent aromatic radical, a monovalent aliphatic radical, a monovalent cycloaliphatic radical, and a monovalent heterocyclic radical; and n is an integer equal to the number of repeating units. In general, the number of repeating units is such that the polymer has an intrinsic viscosity of 2 to 12 dl/g as determined in methanesulfonic acid at 30° C.

Examples of monovalent aromatic radicals include the following:

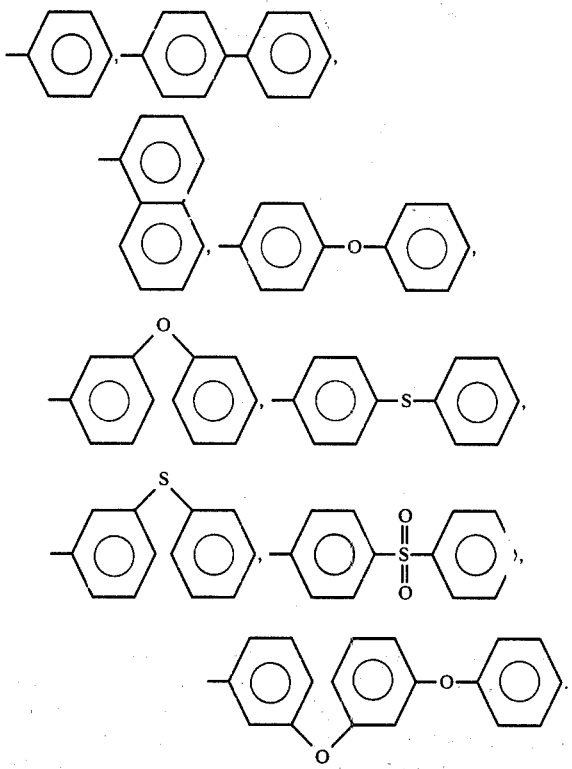

The following are examples of monovalent aliphatic, cycloaliphatic and heterocyclic radicals: —CH$_2$—CH$_3$, —CH$_2$—CH$_2$—CH$_3$, —CH$_2$—CH$_2$—CH$_2$—CH$_3$,

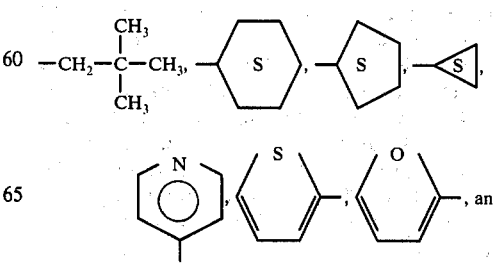

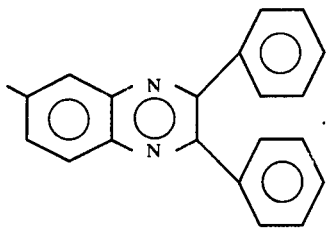

In one embodiment, the present invention resides in a method for preparing the thermally stable polymers. Thus, the polymers are synthesized by the condensation of a phenylated terphenyl dicarboxylic acid with a dihydroxy or dimercapto diaminobenzene dihydrochloride where the hydroxy or mercapto groups are ortho to the amino functionality. The condensation reactions involved are illustrated by the following equation:

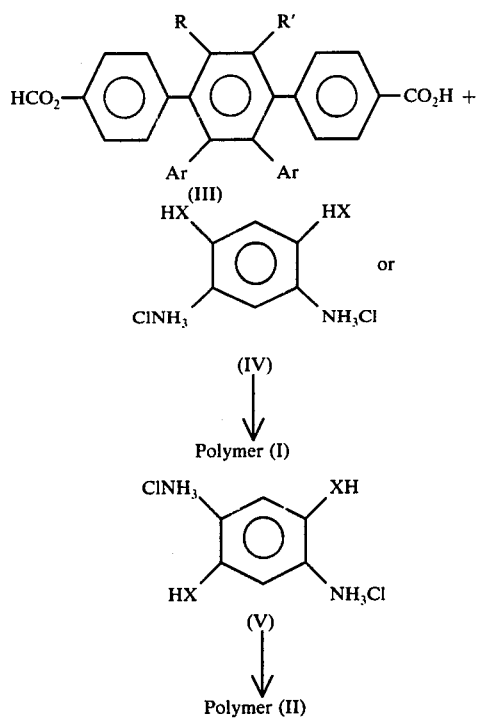

In carrying out the process, the amino monomer (IV) or (V) is initially dehydrochlorinated. This is accomplished by mixing the monomer with polyphosphoric acid and heating the mixture under an inert gas atmosphere at a temperature ranging from about 40° to 100° C for a period of about 6 to 24 hours. Inert gases that can be used include nitrogen, helium and argon. A slurry of phenylated terphenyl dicarboxylic acid (III) in 2,3,4,5-tetrahydrothiophene-1,1-dioxide (sulfolane) is then added to the dehydrochlorinated amino monomer. Although a slight excess of one of the monomers can be employed, the monomers are preferably used in equimolar amounts. The weight ratio of polyphosphoric acid to sulfolane can vary within rather broad limits, e.g., 4:1 to 1:4. However, it is preferred to use a 1 to 1 ratio so as to rapidly obtain a homogeneous mixture.

The reaction mixture is heated at a temperature in the range of about 100° to 200° C for a period ranging from about 18 to 36 hours. In a preferred procedure, the reaction temperature is increased gradually during the reaction period, e.g., 130° C for 3 hours, 150° C for 3 hours, 170° C for 3 hours, 185° C for 3 hours, and 195° to 200° C for 16 hours. At the end of the reaction period, the polymer is precipitated from solution by pouring the reaction mixture into methanol. The polymer is purified by washing with methanol and then continuously extracting with methanol for a period of about 4 to 16 hours. After allowing the polymer to air dry, it is dissolved in methanesulfonic acid, filtered, inversely precipitated with methanol, stirred with concentrated ammonium hydroxide, and washed with water. The ammonia free water solution is then filtered and washed with methanol and methanol-benzene mixtures, gradually changing to 100 percent benzene. The swollen polymer is frozen and finally dried under reduced pressure to give a purified polymer having a high molecular weight.

The p-terphenylene-dicarboxylic acid monomers (III) in which at least one of R and R' groups is other than hydrogen are prepared by a four-stage procedure as illustrated by the following equations:

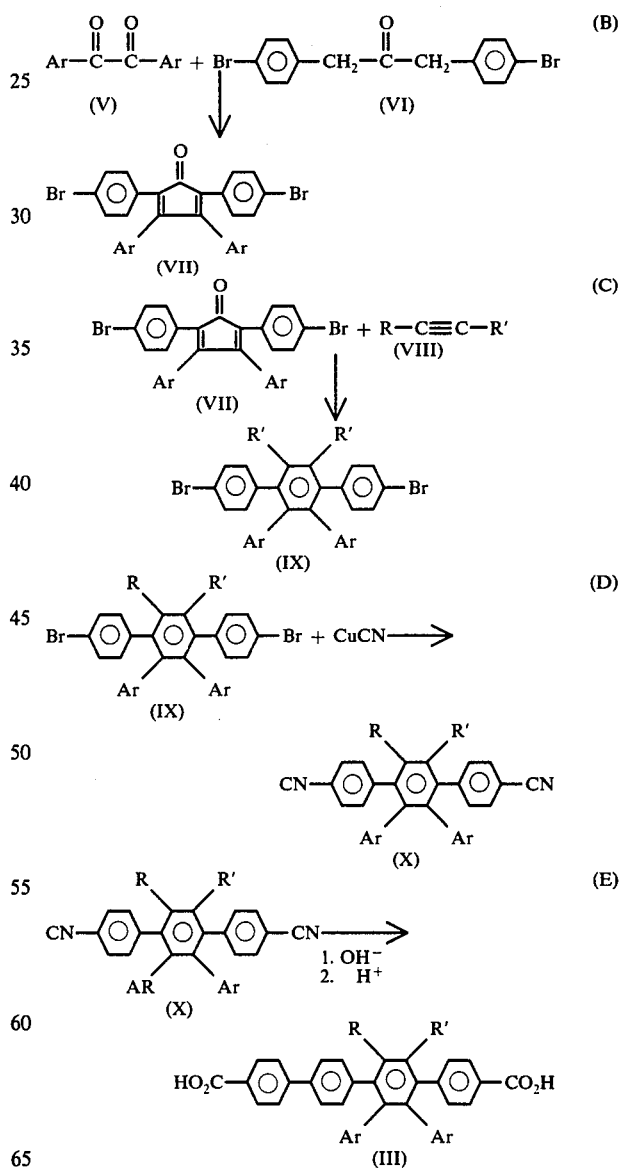

In the foregoing equations R, R' and Ar are as defined hereinabove.

As shown by equation (B), an aromatic benzil (V) is reacted with 1,3-bis(p-bromophenyl)-2-propanone (VI) to form 2,5-bis(p-bromophenyl)-3,4-diarylcyclopentadienone (VII). Substantially equimolar amounts of compounds (V) and (VI) are utilized, and the reaction is carried out in the presence of an alkali metal hydroxide under reflux conditions in a suitable reaction medium. An alcohol, such as ethanol, can be conveniently used as the reaction medium. The amount of alkali metal hydroxide can vary within rather broad limits but generally ranges from about 0.1 to 0.75 mole per mole of the aromatic benzil. The reaction medium is usually maintained under reflux conditions for a period ranging from about 15 minutes to 1 hour.

In the second stage of the process as shown by equation (C), compound (VII) prepared in the first stage is reacted with acetylene compound (VIII) to form dibromo terphenyl compound (IX). It is noted that no more than one of the R and R' radicals of compound (VIII) can be hydrogen. In conducting the reaction, a molar excess of the acetylene compound is used, e.g., 1.5 to 10 moles per mole of compound (VII). The reaction is carried out in a suitable reaction medium, such as a chlorinated hydrocarbon, under reflux conditions for a period of about 15 minutes to 1 hour. As indicated by equation (D), the third stage involves reacting compound (IX) with cuprous cyanide to form dicyano terphenyl compound (X). A molar excess of cuprous cyanide, e.g., 1.5 to 3 moles per mole of compound (IX), is utilized. The reaction is conducted in an inert atmosphere under reflux conditions, utilizing a suitable reaction medium, such as N-methyl-2-pyrrolidone. A reaction period of about 8 to 24 hours is usually sufficient to effect the substitution of the bromine atoms with cyano groups. In the fourth and final stage of the process (equation E), terphenyl compound (X) is hydrolized with an inorganic base and then acidified to provide p-terphenylene-dicarboxylic acid (III).

When it is desired to synthesize a monomer (III) in which R and R' are both hydrogen, acetylene is not used in the reaction represented by equation (C). Rather, bicyclo[2,2,1]heptadiene is employed in the Dels-Alder reaction, giving the dibromo terphenyl (IX) with the loss of carbon monoxide and cyclopentadiene. The reaction involved is illustrated by the following equation:

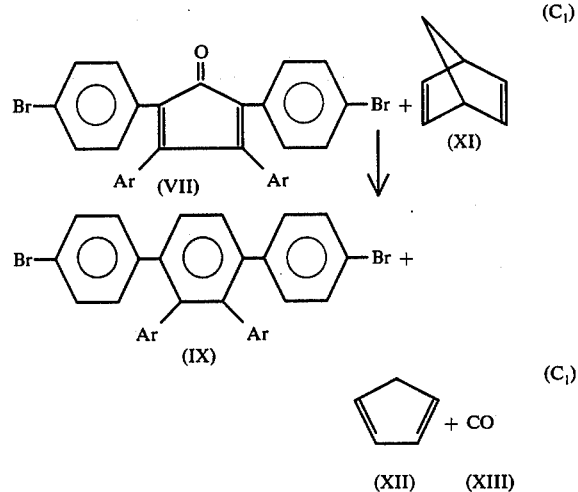

In conducting the reaction shown by equation (C₁), a molar excess of the heptadiene (XI) is reacted with the dibromo cyclopentadiene (VII) prepared as described above (equation B). The reaction is carried out under reflux conditions, using a hydrocarbon as the reaction medium. During the reaction period, which usually lasts from 6 to 12 hours, cyclopentadiene (XII) and carbon monoxide (XIII) are evolved and the dibromo terphenyl compound (IX) is formed. The third and fourth stages of the process as described above are then followed in preparing compound (III) in which R and R' are both hydrogen.

As seen from the foregoing, the source of the Ar groups of compound (III) is the benzil compounds (V). Examples of such compounds that can be used include benzil; 4,4'-phenoxybenzil; 3,3'-phenoxybenzil; 4,4'-phenylthiobenzil; 3,3'-phenylthiobenzil; 4,4'-phenylsulfonylbenzil; 3,3'-phenylsulfonylbenzil; and the like. The source of the R and R' groups, when no more than one of the groups is hydrogen, is the acetylene compound (VIII). Examples of suitable acetylene compounds include phenylacetylene, naphthylacetylene, diphenylacetylene, dinaphthylacetylene, 4-phenoxyacetylene, 4,4'-diphenoxydiphenylacetylene, 3-phenoxyacetylene, 3,3'-diphenoxydiphenylacetylene, 4-phenylthioacetylene, 4-ethynylpyridine, 2-ethynylfuran, 2-ethynylthiophene, cyclohexylacetylene, n-butylacetylene, n-propylacetylene, isopropylacetylene, and the like. As indicated above, when R and R' of the compound of Formula (III) are both hydrogen, bicyclo[2,2,1]heptadiene is used instead of acetylene per se. For additional details regarding the novel p-terphenylene-dicarboxylic acid monomers, reference may be made to our copending application Ser. No. 811,366, filed on June 29, 1977, the disclose of which is incorporated herein by reference.

The amino monomers (IV) and (V) used in synthesizing the polymers of this invention are well known compounds that are described in the literature. Examples of such amino compounds include the following:

a. 2,4-dihydroxy-m-phenylenediamine dihydrochloride, giving a heterocyclic polymer having a benzo(1,2-d:5,4-d')bisoxazole unit,

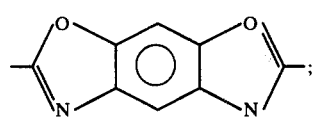

b. 2,4-dimercapto-m-phenylenediamine dihydrochloride, giving a heterocyclic polymer having a benzo(1,2-d:5,4-d')bisthiazole unit,

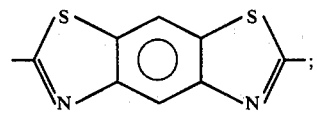

c. 2,5-dimercapto-p-phenylenediamine dihydrochloride, giving a heterocyclic polymer having a benzo(1,2-d:4,5-d')bisthiazole unit,

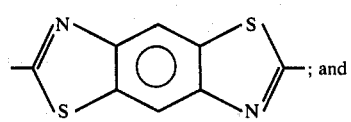; and d. 2,5-dihydroxy-p-phenylenediamine dihydrochloride, giving a heterocyclic polymer having a benzo(1,2-d:4,5-d')bisoxazole unit,

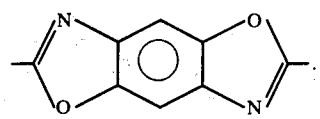

A more complete understanding of the invention can be obtained by referring to the following illustrative examples which are not intended, however, to be unduly limitative of the invention.

EXAMPLE I

Poly[benzo(1,2-d:5,4-d')bisoxazole-2,6-diyl]-1,4''-(2', 3', 5'-triphenyl-p-terphenylene To a 100 ml resin flask containing 0.5 g (2.34 mmole) of 2,4-dihydroxy-m-phenylenediamine dihydrochloride was added 219 g of polyphosphoric acid. The mixture, under a nitrogen atmosphere, was heated to 55° C after 2 hours and 70° C after 18 hours to dehydrochlorinate the amino monomer. A slurry containing 1.283 g (2.34 mmole) of 4,4''-dicarboxy-2', 3', 5'-triphenyl-p-terphenyl and 80 ml of 2,3,4,5-tetrahydrothiophene-1,1-dioxide (sulfolane) was added to the dehydrochlorinated monomer. An additional 30 ml of sulfolane was added to the flask which contained the slurry in 5–10 ml portions, heated to 150° C and added to the polymerization pot to insure quantitative transfer. The reaction mixture was then heated as follows: 120°–135° C/ 18 hours; 150°–160° C/5 hours; 175°–185° C/3 hours. The polymer was precipitated into methanol, washed with methanol, and then continuously extracted with methanol overnight. The polymer was allowed to air dry then dissolved in methanesulfonic acid, filtered, inversely precipitated with methanol, stirred with concentrated ammonium hydroxide and washed with water. The ammonia free water solution was filtered and washed with methanol, methanol/benzene mixtures, gradually changing to 100% benzene. The swollen polymer was then frozen and dried under reduced pressure to give 1.3 g (97% yield) of polymer with an intrinsic viscosity of 9.32 dl/g, as determined in methanesulfonic acid at 30° C.

Analysis Calc'd for $(C_{44}H_{26}N_2O_2)_n$: C,85.97; H,4.26; N,4.56. Found: C,85.12; H,3.59; N,3.81.

EXAMPLE II

Poly{[benzo(1,2-d:5,4-d')bisoxazole-2,6-diyl]-1,4'-(2', 3'-diphenyl)-p-terphenylene}

The diphenylated polymer was prepared in a manner analogous to that of Example I, using 0.6 g (2.816 mmole) of 2,4-dihydroxy-m-phenylenediamine dihydrochloride, 1.32 g (2.816 mmole) of 4,4''-dicarboxy-2,3'-diphenyl-p-terphenyl, 120 g of polyphosphoric acid and 100 ml of sulfolane. The polymerization mixture was heated as follows: 65°–100° C/1 hour; 130° C/2 hours, 140°–160° C/20 hours; and 175° C/1 hour. The polymer was climbing up the stirrer at this time and thus was precipitated into methanol and worked up as described above to give 1.48 g (98% yield). The intrinsic viscosity of the material was 4.91 dl/g as determined in methanesulfonic acid at 30° C.

Analysis Calc'd for $(C_{38}H_{22}N_2O_2)_n$: C,84.74; H,4.12. Found: C,83.95; H,4.01.

EXAMPLE III

Poly{[benzo(1,2-d:5,4-d')bisoxazole-2,6-diyl]-1,4''-(2', 3', 5', 6'-tetraphenyl)-p-terphenylene}

The tetraphenylated polymer was prepared in a manner analogous to that of Example I, using 0.50 g (2.346 mmole) of 3,4-dihydroxy-m-phenylenediamine dihydrochloride, 1.461 g (2.346 mmole) of 4,4''-dicarboxy-2', 3', 5', 6'-tetraphenyl-p-terphenyl, 94 g of polyphosphoric acid and 85 ml of sulfolane. The polymerization mixture was heated as follows: 70°–120° C/1 hour; 140°–150° C/12 hours; 175° C/2 hours; 210° C/1 hour. The polymer was poured into methanol and worked up as described above to give 1.57 g (97% yield). The intrinsic viscosity of the material, as determined in methanesulfonic acid at 30° C was 2.48.

Analysis Calc'd for $(C_{50}H_{30}N_2O_2)_n$: C,86.93; H,4.38. Found: C,86.53; H,3.98.

The molecular geometry of the tetrafunctional amino monomers is such as to produce a rod-like, para-ordered heterocyclic benzoxazole or benzthiazole polymer when condensed with the p-terphenylenedicarboxylic acids. The extended rod-like structure of the polymeric materials indicates that the materials exhibit liquid crystalline behavior in solution and therefore provide superior mechanical properties on fabrication. Furthermore, the presence of the pendant monovalent aromatic moieties derived from the p-terphenylene-dicarboxylic acids prevents close packing of the polymer chains and concomitant reduction of intermolecular associations. The solubility parameters of the polymers are thereby improved, rendering them soluble in solvents other than highly corrosive acids. For example, the polymers are soluble in m-cresol containing between 20 and 30 percent dichloroacetic or formic acid. When coupled with the high degree of thermal and hydrolytic stability possessed by the polymers, the foregoing properties render them particularly useful in the fabrication of composites for use in high temperature environments.

As will be evident to those skilled in the art, modifications of the present invention can be made in view of the foregoing disclosure without departing from the spirit and scope of the invention.

We claim:

1. A para-ordered aromatic heterocyclic polymer consisting essentially of repeating units having a structure as represented by one of the following formulas:

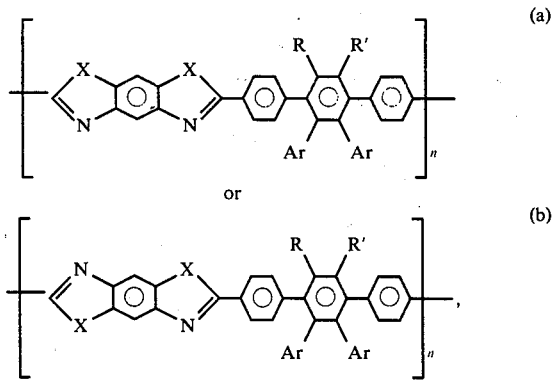

wherein X in each formula is S or O; Ar is

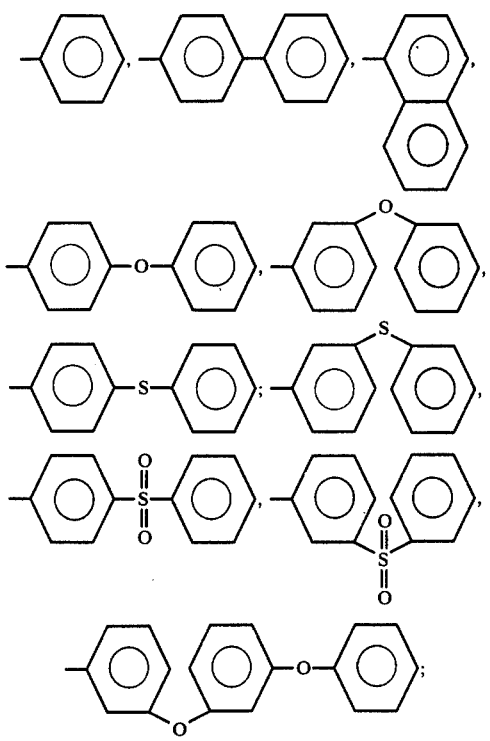

R and R' are hydrogen, a monovalent aromatic radical as listed above, —CH₂—CH₃, —CH₂—CH₂—CH₃, —CH₂—CH₂—CH₂—CH₃,

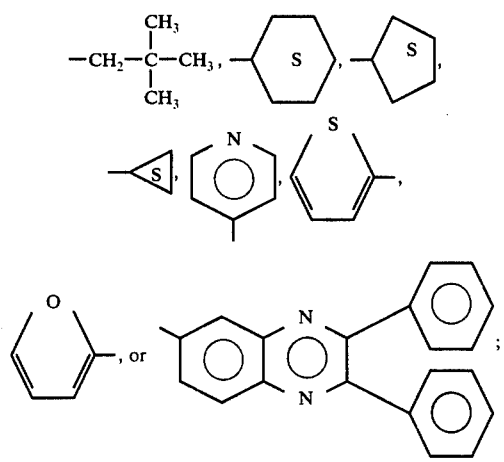

and n is an integer equal to the number of repeating units and has a value such that the polymer has an intrinsic viscosity of 2 to 12 dl/g as determined in methanesulfonic acid at 30° C.

2. The para-ordered aromatic heterocyclic polymer according to claim 1 that consists essentially of repeating units having a structure as represented by formula (a).

3. The para-ordered aromatic heterocyclic polymer according to claim 1 that consists essentially of repeating units having a structure as represented by formula (b).

4. The para-ordered aromatic heterocyclic polymer according to claim 2 in which X is O, Ar is

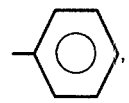

and R and R' are each

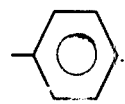

5. The para-ordered aromatic heterocyclic polymer according to claim 2 in which X is S, Ar is

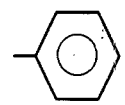

and R and R' are each

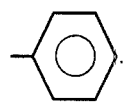

6. The para-ordered aromatic heterocyclic polymer according to claim 2 in which X is O, Ar is

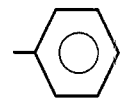

and R and R' are each hydrogen.

7. The para-ordered aromatic heterocyclic polymer according to claim 3 in which X is O, Ar is

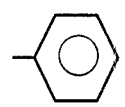

and R and R' are each

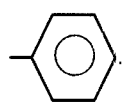

8. The para-ordered aromatic heterocyclic polymer according to claim 3 in which X is S, Ar is

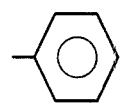

and R and R' are each

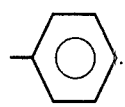

* * * * *

UNITED STATES PATENT AND TRADEMARK OFFICE
CERTIFICATE OF CORRECTION

PATENT NO. : 4,108,835
DATED : August 22, 1978
INVENTOR(S) : Fred E. Arnold et al.

It is certified that error appears in the above—identified patent and that said Letters Patent is hereby corrected as shown below:

Column 4, lines 60-65, the formula should appear as shown below.

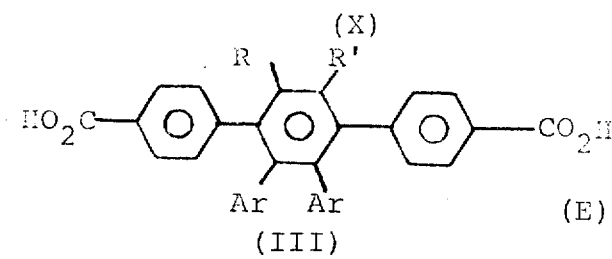

Signed and Sealed this

Fifth Day of January 1982

[SEAL]

Attest:

Attesting Officer

GERALD J. MOSSINGHOFF

*Commissioner of Patents and Trademarks*